US010200250B2

(12) United States Patent
Roy et al.

(10) Patent No.: US 10,200,250 B2
(45) Date of Patent: Feb. 5, 2019

(54) DISTRIBUTION OF A VIRTUAL NETWORK OPERATOR SUBSCRIPTION IN A SATELLITE SPOT-BEAM NETWORK

(71) Applicants: Satyajit Roy, Gaithersburg, MD (US); Hanny Kadrichu, North Potomac, MD (US); Archana Gharpuray, Gaithersburg, MD (US)

(72) Inventors: Satyajit Roy, Gaithersburg, MD (US); Hanny Kadrichu, North Potomac, MD (US); Archana Gharpuray, Gaithersburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 38 days.

(21) Appl. No.: 15/371,490

(22) Filed: Dec. 7, 2016

(65) Prior Publication Data
US 2018/0152351 A1 May 31, 2018

Related U.S. Application Data

(60) Provisional application No. 62/426,592, filed on Nov. 27, 2016.

(51) Int. Cl.
*H04J 3/24* (2006.01)
*H04B 7/185* (2006.01)
(Continued)

(52) U.S. Cl.
CPC ..... *H04L 41/0896* (2013.01); *H04B 7/18528* (2013.01); *H04B 7/2041* (2013.01);
(Continued)

(58) Field of Classification Search
CPC .............. H04L 41/0896; H04L 41/042; H04B 7/18528; H04B 7/18513; H04B 7/185;
(Continued)

(56) References Cited

U.S. PATENT DOCUMENTS 9,577,741 B2 * 2/2017 Roy .................. H04B 7/18523
9,654,335 B2 * 5/2017 Axelrod ................ H04L 41/042
(Continued)

OTHER PUBLICATIONS

International search report for corresponding PCT Application PCT/US2017/062946 dated Mar. 5, 2018.

*Primary Examiner* — Brian T O Connor
(74) *Attorney, Agent, or Firm* — Capitol City TechLaw; Jasbir Singh

(57) ABSTRACT

A system and method for bandwidth management for a Host Network Operator (HNO) is disclosed. The method including: providing shared beams shared by two or more of a plurality of Virtual Network Operators (VNOs), wherein each VNO has a subscription including a global bandwidth limit applicable for a flow control epoch for each VNO and a terminal subscription for each terminal associated with the respective VNO; aggregating, in the current flow control epoch, a demand and the terminal subscriptions of active terminals per shared beam per VNO; distributing, for each shared beam per VNO, the aggregated demand and active terminal subscriptions into a distribution bandwidth per shared beam per VNO, wherein the distribution bandwidth is based on the respective global bandwidth limit of the respective VNO; and proportionally balancing, for each shared beam, an oversubscription of the distribution bandwidths per shared beam per VNO based on the proportionalities of the global bandwidth limit of each VNO subscribing to the shared beam, to provide a proportional distribution bandwidth per shared beam per VNO.

20 Claims, 3 Drawing Sheets

(51) Int. Cl.
  *H04B 7/204*   (2006.01)
  *H04L 12/24*   (2006.01)
  *H04W 28/08*   (2009.01)

(52) U.S. Cl.
  CPC ........... *H04L 41/042* (2013.01); *H04W 28/08* (2013.01); *H04B 7/185* (2013.01); *H04B 7/18508* (2013.01); *H04B 7/18513* (2013.01); *H04B 7/18523* (2013.01); *H04B 7/204* (2013.01); *H04J 3/245* (2013.01); *H04J 2203/0037* (2013.01)

(58) Field of Classification Search
  CPC ................ H04B 7/204; H04B 7/18508; H04B 7/18523; H04W 28/08; H04J 2203/0037; H04J 3/245
  See application file for complete search history.

(56) References Cited

U.S. PATENT DOCUMENTS

| | | | | |
|---|---|---|---|---|
| 9,680,559 | B1* | 6/2017 | Freedman | H04B 7/1851 |
| 9,887,765 | B1* | 2/2018 | Freedman | H04B 7/18519 |
| 2005/0157652 | A1 | 7/2005 | Tang et al. | |
| 2014/0244808 | A1 | 8/2014 | Axelrod et al. | |
| 2015/0163848 | A1* | 6/2015 | Lin | H04B 7/18506 370/329 |
| 2016/0072574 | A1 | 3/2016 | Xu et al. | |
| 2016/0072691 | A1* | 3/2016 | Xu | H04B 7/18578 370/252 |
| 2016/0142327 | A1 | 5/2016 | Johnson et al. | |
| 2016/0183126 | A1* | 6/2016 | Roy | H04W 28/085 370/322 |
| 2017/0034175 | A1* | 2/2017 | Leung | H04L 63/0807 |

* cited by examiner

DISTRIBUTION OF A VIRTUAL NETWORK OPERATOR SUBSCRIPTION IN A SATELLITE SPOT-BEAM NETWORK

CROSS REFERENCE TO RELATED APPLICATIONS

The present application claims the benefit of U.S. Provisional Application No. 62/426,592, filed Nov. 27, 2016, which is incorporated in its entirety by reference for all purposes as if fully set forth herein.

FIELD

The present teachings disclose a method and system where a Virtual Network Operator (VNO) may subscribe to a system level aggregated bandwidth for one global subscription across multiple satellites or at an individual satellite level. In some embodiments, a VNO can subscribe bandwidth at a gateway level or even at a beam level. In particular, different VNOs in a network can be provided a subscription at a system level across multi-satellites, a subscription at a system level on one satellite, a subscription having a gateway scope, or a subscription at a beam level, among others.

BACKGROUND

Use of a High Throughput Satellite (HTS) using spot beam technology, emerged in commercial satellite communications over the last decade. A significant increase in capacity was achieved with a HTS with frequency reuse across multiple narrowly focused spot beams. However, because of the high number of spot beams, a HTS uses geographically spread gateways or teleports, and multiple HTSs are deployed in a system to cover more geographic regions.

In a wholesaler-reseller network, a Virtual Network Operator (VNO) buys bandwidth resources from a Host Network Operator (HNO), usually without investing in the physical infrastructure. The prior art subscription model consists of various parameters that are statically provisioned for each VNO per beam per gateway. The per beam per gateway parameters are managed by beam bandwidth managers on the gateway to limit each VNOs use of the beam per that beam's subscription parameters and by proportionally partitioning any over subscriptions within the beam. Due to the localized bandwidth management for each beam, some of a VNO's demands can be subject to congestion on a beam, while there is spare capacity on another beam that the VNO also subscribes to. As such, the localized bandwidth management cannot respond dynamically to the needs of the VNO over all and the system capacity the VNO has subscribed to.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings disclose a method and system where a Virtual Network Operator (VNO) may subscribe to a system level aggregated bandwidth with a subscription at a system level across multi-satellites, a subscription at a system level on one satellite, a subscription having a gateway scope, or a subscription at a beam level, among others. The present subscription model provides a separate set of parameter values for the inroute (uplink) and outroute (downlink) directions including parameter values for maximum bandwidth, minimum bandwidth, real-time bandwidth and multicast bandwidth. In some embodiments, the multicast bandwidth subscription parameter applies to the outroute only. In some embodiments, the real-time bandwidth and multicast bandwidth parameters are only available for a beam level subscription.

A method for bandwidth management for a Host Network Operator (HNO) is disclosed. The method including: providing shared beams shared by two or more of a plurality of Virtual Network Operators (VNOs), wherein each VNO has a subscription including a global bandwidth limit applicable for a flow control epoch for each VNO and a terminal subscription for each terminal associated with the respective VNO; aggregating, in the current flow control epoch, a demand and the terminal subscriptions of active terminals per shared beam per VNO; distributing, for each shared beam per VNO, the aggregated demand and active terminal subscriptions into a distribution bandwidth per shared beam per VNO, wherein the distribution bandwidth is based on the respective global bandwidth limit of the respective VNO; and proportionally balancing, for each shared beam, an oversubscription of the distribution bandwidths per shared beam per VNO based on the proportionalities of the global bandwidth limit of each VNO subscribing to the shared beam, to provide a proportional distribution bandwidth per shared beam per VNO.

A system to perform bandwidth management for a Host Network Operator (HNO) is disclosed. The system including: shared beams shared by two or more of a plurality of Virtual Network Operators (VNOs), wherein each VNO has a subscription including a global bandwidth limit applicable for a flow control epoch for each VNO and a terminal subscription for each terminal associated with the respective VNO; a beam-level bandwidth manager to aggregate, in the current flow control epoch, a demand and the terminal subscriptions of active terminals per shared beam per VNO; and a Global Bandwidth Manager (GBM). The GBM operates to distribute, for each shared beam per VNO, the aggregated demand and active terminal subscriptions into a distribution bandwidth per shared beam per VNO, wherein the distribution bandwidth is based on the respective global bandwidth limit of the respective VNO; and to proportionally balance, for each shared beam, an oversubscription of the distribution bandwidths per shared beam per VNO based on the proportionalities of the global bandwidth limit of each VNO subscribing to the shared beam, to provide a proportional distribution bandwidth per shared beam per VNO.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof that are illustrated in the appended drawings. Understanding that these drawings depict only typical embodiments and are not therefore to be considered to be limiting of its scope, implementations will be described and explained with additional specificity and detail by the accompanying drawings.

Figure 1:
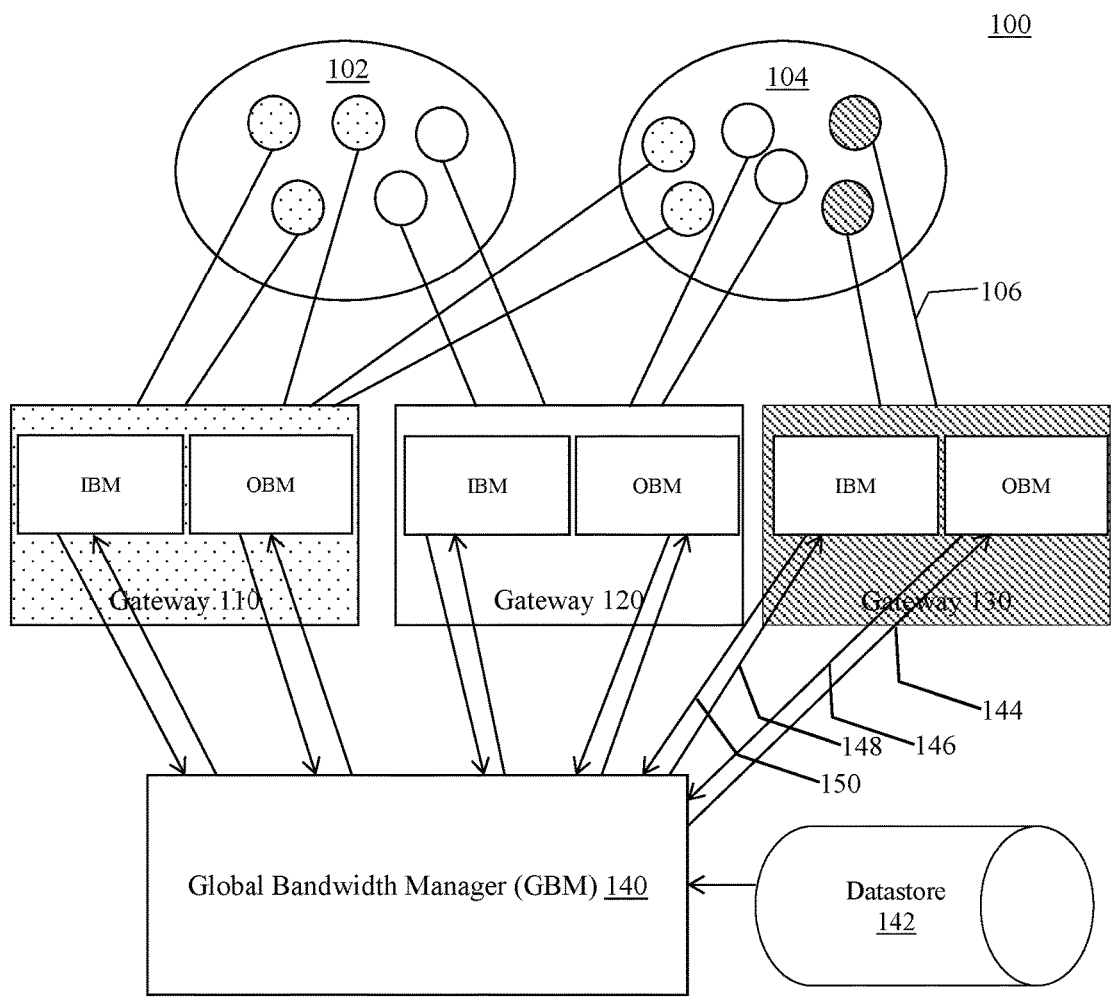
FIG. 1 illustrates an exemplary system to perform bandwidth management for a Host Network Operator (HNO), according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

The terminology used herein is for describing particular embodiments only and is not intended to be limiting of the present disclosure. As used herein, the singular forms "a," "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first," "second," and the like does not imply any particular order, but they are included either to identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

In a wholesaler-reseller network, a Virtual Network Operator (VNO) buys bandwidth resources from a Host Network Operator (HNO). The present teachings disclose a method and system where a Virtual Network Operator (VNO) may subscribe to a system level aggregated bandwidth with a subscription at a system level across multi-satellites, a subscription at a system level on one satellite, a subscription having a gateway scope, or a subscription at a beam level, among others.

The present teachings disclose a flexible network configuration for connecting an access channel to multiple network operators, while also connecting one network operator to multiple access channels. Such an interconnected configuration may achieve improvement on network spectrum utilization, load balancing, mobility management, and Quality of Service (QoS) provisioning. However, the interconnected system brings new challenges to bandwidth management.

According to various embodiments, a satellite network with multiple spot beams under the coverage of one or multiple satellites may be configured as an interconnected network. In such a satellite network, a communication shared access channel from a ground station to a terminal is referred to as outroute or outroute stream; conversely, a communication channel from the terminal to the gateway is referred to as inroute or inroute stream. A network gateway, for example, an Internet Protocol (IP) Gateway (IPGW), may be located at the ground station. The gateway is a processing component that performs traffic management and routing for multiple terminals that share a stream. Terminals connected to the interconnected network may be disposed/dispersed over coverage areas of one or multiple spot beams provided by one of multiple satellites in the satellite network. A VNO may be serviced by one or more beams. Each beam may service one or more VNOs. A gateway may include a beam-level Outroute Bandwidth Manager (OBM). A gateway may include a beam-level Inroute Bandwidth Manager (IBM). A Global Bandwidth Manager (GBM) may be used for performing bandwidth management for VNOs being serviced by the beams and gateways. The GBM be disposed at a central location, for example, near a gateway. The GBM platform and/or a GBM application may be redundant for availability.

The present teachings disclose methods for bandwidth management of a Multi-VNO Multi-beam system for both the inroute and outroute direction. In particular, there may be X beams and Y VNOs where X and Y are greater than one (1), forming an X-by-Y model. X beams may be in multiple beams of one or multiple satellites. Y VNOs may be at one or multiple network operators. Such an X-by-Y system may be fully or partially interconnected, i.e., all X beams may or may not be in service of all Y VNOs, and vice visa. In exemplary embodiments, the present teachings allow dynamic configuration of the X-by-Y system, in other words, the values of X and Y may be varied not only at system provisioning but also while the interconnected network is operational.

In some embodiments, the VNOs may not share any beams or gateways. In some embodiments, the beams may be servicing different operators using different physical resources, such as, gateways, satellites, wireless access channels or wireline access channels, for each VNO. However, the present teachings are compatible with these prior art subscription solutions.

In exemplary embodiments, the present teachings disclose a centralized bandwidth distribution process performed by a Global Bandwidth Manager (GBM) to balance oversubscription, overallotment and dynamic distribution of the oversubscription by the VNOs across the beams. In exemplary embodiments, the present teachings disclose a centralized bandwidth management and reallocation scheme performed by a GBM to manage an overallotment of bandwidth capacity by the HNO to the VNOs' subscriptions and to balance a VNO's subscription based bandwidth allocation using, for example, a proportional distribution across beams. The present teachings provide flexibility for bandwidth allocation with differentiated criteria for mixed application, such as, regular data service and guaranteed bandwidth provisioning. The present teachings are adaptive for various user groups, such as consumer, enterprise and mobility, in sharing the same network resource. The present interconnected Multi-beam Multi-VNO system has superior performance. The present Multi-beam Multi-VNO system improves network resource utilization and flexibility as compared to a prior art subscription system only providing beam level static subscriptions for a VNO. The methods and systems of the present teachings perform bandwidth management in an interconnected Multi-beam Multi-VNO system with improved network resource utilization, superior stability and flexibility in configuring network resources.

In a wholesaler-reseller network, the VNO buys bandwidth resources from a Host Network Operator (HNO), where a subscription model consists of various inroute and outroute parameters for a VNO including Maximum Bandwidth, Minimum Bandwidth, Real-time Bandwidth and Multicast Bandwidth. In some embodiments, some parameters may only apply to an inroute or outroute. For example, the Multicast Bandwidth subscription parameter may apply only to the outroute.

In some embodiments, the Minimum Bandwidth of a VNO is available in the network even in the worst-case link condition. In some embodiments, the Maximum Bandwidth of the HNO's network is oversubscribed among VNOs.

In exemplary embodiments, the GBM dynamically distributes a VNO's global subscription into its subscribed beams in a proportional fair manner using various parameters. These parameters may be, for example, aggregated per beam for the number of terminals by QoS type, aggregated guaranteed subscriptions of different QoS types, aggregated maximum subscriptions of different QoS types, and the like. The GBM may distribute a global subscription of each VNO into the VNO's subscribed beams. In exemplary embodiments, the GBM performs subscription distribution for each VNO independently of other VNOs. After performing the subscription distribution, in some embodiments, the GBM may aggregate the bandwidth distributions that it calculated for each VNO within each beam (including any static VNOs subscriptions configured to utilize the respective beam). For maximum subscription of each VNO, the GBM may calculate oversubscription ratio on each beam, using for example the estimated current beam capacity, and the GBM may balance the oversubscription. In some embodiments, the GBM may balance the aggregated minimum subscription across beams after distributing the minimum guaranteed subscription for each VNO into the VNO's subscribed beams. The GBM may check whether the aggregated minimum subscription across VNOs within a beam exceeds the worst-case capacity, and balance or adjust the bandwidth across beams when the subscription exceeds the beam capacity.

In exemplary embodiments, a beam level bandwidth manager, for example, the OBM and the IBM, may perform actual allocation of VNOs bandwidth on a per beam basis. The beam level bandwidth managers may work independent of each beam. In some embodiments, the beam level bandwidth managers may work independent of a direction of communication, i.e., the inroute may be managed independent of a corresponding outroute. The beam level bandwidth managers take into account the GBM's global VNOs subscription distribution into beams and use that as the beam level subscription of VNOs. In exemplary embodiments, the beam level bandwidth managers enforce the VNOs beam subscription limit and may partition the beam bandwidth across the VNOs in case of congestion.

In the present teachings, a VNO may subscribe aggregated bandwidth at a system level. The system level subscription may include one global subscription across multiple satellites or only a subscription to a satellite. In some embodiments, a VNO may be provided a subscription at a gateway level or at a beam level.

In some embodiments, a VNO's subscription may be limited to one of the options mentioned above, not multiple options at the same time. In some embodiments, different VNOs in a HNO's network can be provided a subscription at a system level across multi-satellites, a subscription at a system level on one satellite, a subscription having a gateway scope, or a subscription at a beam level, among others. In exemplary embodiments, real-time and multicast subscriptions of a VNO may be configured statically at a beam level to provide immediate bandwidth satisfaction for these subscriptions.

A global subscription model, at either system level or gateway level, is advantageous as: it is very difficult for a VNO to know accurately how much bandwidth is needed on a specific beam as traffic flow is dynamic; and the operator need not configure a beam level static subscription information on every beam.

The characteristics of a Multi-satellite subscription may include: a VNO subscriber provides various bandwidth parameters (Maximum and Minimum) as one set of values across multiple satellites, indicating from which beams illuminated by the multiple satellites the VNO wants to provide services to its terminals.

The characteristics of a Satellite level subscription may include parameters such as: a VNO subscriber providing various bandwidth parameters (Maximum and Minimum) separately for each individual Satellite spectrum, indicating from which beams illuminated by these satellite spectrums the VNO wants to provide the services to its terminals, indicating from which gateways the VNO wants to service the beams, or the like.

The characteristics of a Gateway level subscription may include parameters, such as, a VNO subscriber providing various bandwidth parameters (Maximum and Minimum) separately for each individual Gateway capacity, indicating from which beams served by these gateways the VNO wants to provide the services to its terminals, or the like.

The characteristics of a Beam level subscription may include parameters, such as, a VNO subscriber providing various bandwidth parameters (Maximum, Minimum, Real time etc.) separately from each beam through which the VNO intends to provide service to its terminals, or the like. These values may be statically configured at the time of a Virtual Network creation and may be modified manually by an operator during system operation. Beam level subscriptions are not dynamic and are limited as discussed above.

A spot beam network, for example, a Ka beam network, may include many beams. In exemplary embodiments, a smart bandwidth distributor dynamically distributes a VNO's System level (including Multi-satellites) or Gateway level bandwidth subscription into its subscribed beams. Per beam minimum and maximum bandwidths are calculated by the smart bandwidth distributor every epoch, where each epoch may be on the order of minutes. The distribution works both during non-congestion and congestion periods. In some embodiments, on the same beam, when some VNOs may have a static bandwidth per beam subscription, the smart bandwidth distributor may take into consideration the static VNOs' subscribed bandwidth.

In exemplary embodiments, a virtual network includes terminals with different Quality of Service (QoS) types. In the virtual network, some terminals may be best effort terminals and their bandwidth is not guaranteed. In the virtual network, some other terminals may require bandwidth to be guaranteed. Some terminals may subscribe to a real time bandwidth for the real time applications that may have stringent latency and jitter requirements. In some embodiments, at least a portion of the overall terminal's subscription includes the terminal's real time subscription.

In exemplary embodiments, the GBM may focus on elements at a VNO level, where elements may be different across subscribed beams. These elements may include number of active terminals, number of terminals of different QoS types, each terminal's subscription by different QoS types, demand of active terminals, and the like.

FIG. 1 logically illustrates a VNO subscription system, according to various embodiments.

A VNO subscription system 100 may include a satellite 102 and satellite 104, and a gateway 110 and gateway 120. Each of the gateways 110, 120 may serve beams from both satellites 102. 104. In some embodiments, a gateway 130 may only serve beams from the satellite 104. Each of the gateways 110, 120 and 130 may be a distributed gateway. Each of the gateways 110, 120 and 130 may perform bandwidth partition within a beam for one or more VNOs. In some embodiments, the bandwidth partition or division among the VNOs may be performed in a proportional fair manner, for example, by a Global Bandwidth Manager (GBM) 140. In exemplary embodiments, the GBM distributes VNOs global subscriptions into beams and then the OBM or IBM allocates actual bandwidth for VNOs on each beam based on the calculated beam subscription and VNOs weights, and demand on beams.

Each of the gateways 110, 120 and 130 may provide, include or host a beam-level Outroute Bandwidth Manager (OBM) to provide bandwidth management for communications outbound from a gateway or networks connected to the gateway that are communicating over a beam to terminals served by the beam. The OBM may gather and forward outroute demand 146 to the GBM 140. Outroute demand 146 may include an aggregate per VNO per beam outroute subscription including demand and usage over terminals. Outroute demand 146 may include current capacity information per beam. The GBM computes an outroute allocation 144 including bandwidth allocation per VNO per beam and forwards the outroute allocation 144 to the OBM for allocating the beam capacity to the VNO per the outroute allocation 144.

Each of the gateways 110, 120 and 130 may provide, include or host an Inroute Bandwidth Manager (IBM) to provide bandwidth management for communications inbound from Very Small Aperture Terminals (VSATs) that are communicating over a beam to the beam's respective gateway or networks connected to the respective gateway. The IBM may gather and forward inroute demand 150 to the GBM 140. Inroute demand 150 may include an aggregate per VNO per beam inroute subscription including demand and usage over terminals. Inroute demand 150 may include current capacity information per beam. The GBM computes an inroute allocation 148 including bandwidth allocation per VNO per beam and forwards the inroute allocation 144 to the IBM for allocating the beam capacity to the VNO per the inroute allocation 144.

In exemplary embodiments, the VSATs maybe mobile devices adapted to be readily movable from a first geographic area to a second geographic area, where the first and second geographic areas are illuminated by different beams included in the system 100. In some embodiments, the VSATs are fixedly disposed and are not movable by an end-user. In exemplary embodiments, the VSATs may be active on an ad-hoc basis, such that a demand and a subscription associated with the VSAT need to be accounted for in the bandwidth distribution in an ad-hoc manner. In exemplary embodiments, data-flows associated with active VSATs may be active or inactive on an ad-hoc basis, such that demands by the active data-flows need to be accounted for by the bandwidth distribution in an ad-hoc manner. In exemplary embodiments, some of the VSATs serviced by the network may be active at the time, for example, during office hours, and the network maybe subject to a congestion such that bandwidth starvation caused by the congestion needs to be accounted for in the bandwidth distribution.

The Global VNO bandwidth distributor or Global Bandwidth Manager (GBM) 140 may be disposed in a location, for example, a central location near one of the gateways 110, 120, 130. In some embodiments, the GBM may be co-hosted with one of the gateways 110, 120, 130. The GBM 140 may distribute an available capacity of the beams in the VNO subscription system 100 based on a VNO subscription retrieved from a data store 142, outroute demand 148 and/or inroute demand 140. In some embodiments, the GBM 140 may perform bandwidth distribution for one or more VNOs within one beam. In some embodiments, the GBM 140 may perform bandwidth distribution for one VNO within one beam. In some embodiments, the GBM 140 may direct each of the gateways 110, 120 and 130 to perform bandwidth allocation within one beam for the VNOs sharing the beam per the bandwidth distribution determined by the GBM for the VNOs sharing the beam.

The smart bandwidth distributor or GBM 140 may distribute the bandwidth using, for example, a proportional fair distribution based on multi-dimensional factors to calculate how much bandwidth is to be allocated to each VNO on different beams based on the VNO's subscription. A level of a VNO's subscription may be set as a system, a gateway, or a beam level subscription. In some embodiments, the GBM 140 may distribute bandwidth based on a Quality of Service (QoS) requested for the communication and the VNO's subscription. For example, the GBM 140 may allocate bandwidth to a VNO by differentiating between a VNOs guaranteed bandwidth subscription and non-guaranteed (best effort) subscription. In some embodiments, the GBM 140 bandwidth distribution strives for fairness from a Quality of Service (QoS) perspective for each of the VNOs.

In exemplary embodiments, the GBM 140 allocates different significance to one or more of the bandwidth parameters. For example, the minimum and maximum bandwidth subscription parameters for a VNO are given different significances, and the GBM 140 may separately calculate per beam minimum and maximum bandwidths using different factors and schemes.

Embodiment 1: Minimum Bandwidth Distribution

A VNO may subscribe to either a System level or Gateway level minimum bandwidth. This bandwidth may be guaranteed bandwidth for the VNO. The system 100 is sized in such a way that normally the minimum bandwidth is available in the network for all VNOs. Every flow control epoch, the GBM 140 receives information for the aggregated guaranteed bandwidth subscription of all active terminals separately for each beam and VNO, for example, from the IBM on gateway 100, or the OBM on gateway 120. The duration of a flow control epoch for the inroute and outroute may be identical or different. For example, a flow control epoch maybe set as every 100 milliseconds (ms) on the outroute, while a flow control epoch for the inroute maybe set as every 360 ms. Is some embodiments, the inroute flow control epoch may coincide with a super-frame mark for the beam. The GBM 140 may run a proportional fair distribution to partition a VNO's System or Gateway level minimum subscription into its subscribed beams based on the aggregate guaranteed subscription of its active terminals on each beam.

When the VNO subscription is at a system level, the GBM 140 may perform as follows. Let Mi,j be the aggregated guaranteed subscription of all active terminals of a VNO i in a beam j at any instant of time, and Msi be the System level minimum subscription of a VNO i, then the minimum subscription distribution of that VNO on beam j may be calculated, while enforcing that the summation of minimum bandwidth distribution into beams for a VNO does not exceed the VNO's global system level minimum subscription, as:

$$Mi,j=(Msi*Mi,j)/(\text{summation of }Mi,j\text{ over all beams }j=i\text{ to }J)$$

When the VNO subscription is at a gateway level, the GBM 140 may perform as follows. Let Mi,j be the aggregated guaranteed subscription of all active terminals of a VNO i in a beam j at any instant of time, and let Mgi be the Gateway level minimum subscription of a VNO i, then the minimum subscription distribution of that VNO on beam j may be calculated as:

$$Mi,j=(Mgi*Mi,j)/(\text{summation of }Mi,j\text{ over all beams }j=i\text{ to }J)$$

In some embodiments, the present teachings may enforce that the summation of minimum bandwidth distribution into beams for a VNO does not exceed the VNOS's Gateway level minimum subscription.

An Exponential Moving Average (EMA) of Mi,j may be calculated in each flow control epoch over multiple epochs within an update cycle (a few minutes) and at the time of update, the latest EMA value may be used as the minimum subscription on each beam.

If a VNO has all best effort terminals within a beam, then the above scheme will calculate a zero (0) minimum bandwidth on that team. A configured minimum percentage of the overall gateway minimum subscription may be calculated for such a beam in the anticipation that traffic may arrive on that beam. These values assigned to such type of beams may be borrowed from other beams and other beams minimum values are accordingly adjusted.

Once all VNO's minimum subscriptions are distributed into eligible beams, the process aggregates each VNO's minimum subscription including any static minimum subscription for each beam. In exemplary embodiments, the aggregated minimum across VNOs within a beam may always be available. A worst case beam capacity maybe configured in datastore 142. If the aggregate minimum subscription across terminals within a beam exceeds the worst case beam capacity value, then the minimums on the other beams are adjusted so that a VNO shall not be deprived of its eligible minimum subscription.

Embodiment 2: Maximum Bandwidth Distribution

A VNO may subscribe to a System level or Gateway level maximum or peak bandwidth. In some embodiments, this bandwidth maybe treated as the best effort bandwidth. Every flow control epoch, the GBM receives the information of aggregated peak bandwidth subscription of active terminals separately for each beam and each VNO, and also the current traffic demand, for example, outroute demand 146 or inroute demand 150. The GBM 140 may run a proportional fair algorithm to partition a VNO's Gateway level maximum subscription into its subscribed beams based on the aggregate maximum subscription of its active terminals and the current demand of active terminals on each beam.

In exemplary embodiments, when the VNO's subscription is at a system level the system may perform as follows. Let MAXi,j be the aggregated maximum subscription of all active terminals of a VNO i in a beam j at any instant of time and Di,j be the aggregated current demand from all active terminals of a VNO i in a beam j. Let MAXsi be the System level maximum subscription of a VNO i, then the maximum subscription distribution of that VNO on beam j may be calculated as:

$$MAXi,j=(MAXsi*(alpha*Mi,j+(1-alpha)*Di,j)/(\text{summation of }(alpha*Mi,j+(1-alpha)*Di,j)\text{over all beams }j=i\text{ to }J)$$

A static factor alpha may provide bias between configured maximum subscription and actual demand in the above calculation. By default, the value of alpha may give more weight to demand, for example, alpha may be set to 0.1, 0.2, 0.3 or the like. The present teachings may enforce that the summation of maximum bandwidth distribution into beams for a VNO not exceed its global system level maximum subscription based on the EMA of Mi,j and Di,j.

When the VNO subscription is at a gateway level, the present teachings may be performed as follows. Let Maxi,j be the aggregated maximum subscription of all active terminals of a VNO i in a beam j at any instant of time and Di,j be the aggregated current demand from all active terminals of a VNO i in a beam j. Let MAXgi be the Gateway level maximum subscription of a VNO i, then the maximum subscription distribution of that VNO on beam j may be calculated as:

$$MAXi,j=(MAXgi*(alpha*Mi,j+(1-alpha)*Di,j)/(\text{summation of }(alpha*Mi,j+(1-alpha)*Di,j)\text{over all beams }j=i\text{ to }J)$$

The present teachings enforce that the summation of maximum bandwidth distribution into beams for a VNO not exceed its gateway level maximum subscription. An exponential moving average (EMA) of Maxi,j may be calculated in each flow control epoch over multiple epochs within an update cycle (a few minutes) and at the time of update, the latest EMA value of Mi,j and Di,j may be used as the maximum subscription on each beam.

Once all VNO's maximum subscription are distributed among eligible beams, the present teachings aggregate all of the VNO's maximum subscription including any static maximum subscription for each beam. Based on the estimated current capacity, the oversubscription ratio in each beam is calculated. In case of imbalance of oversubscription ratio over a beam, the maximum bandwidth distribution may be adjusted to keep the oversubscription ratio more or less balanced. Also, adjustment may be done based on the VNO's priority.

Embodiment 3: Minimum Subscription Distribution

A VNO may subscribe to a Gateway or systemlevel minimum bandwidth. Is some embodiments, a gateway level bandwidth subscription may be provided on an outroute only, an inroute only, or both. For example and brevity, the present disclosure will be directed to the outroute. The gateway level bandwidth subscription may be used as a guaranteed bandwidth for the VNO. The system may be sized in such a way that a system's bandwidth capacity exceeds an aggregate of the minimum bandwidths for all VNOs. Every flow control epoch, for example, every 100 milliseconds (ms), the GBM receives at least the aggregated minimum bandwidth subscription information of all active terminals separately for each beam and VNO. The information may be collected by a gateway, received by a beam-level bandwidth manager, and provided by the beam-level bandwidth manager to the GBM. The GBM may run a proportional fair algorithm to partition a VNO's Gateway level minimum subscription into the gateway's subscribed beams based on the aggregate minimum subscription of the gateway's active terminals on each beam.

At startup or initialization, the GBM has no information regarding minimum bandwidth distribution on beams. The first distribution maybe calculated at the first flow control cycle. In some embodiments, initially the distribution calculation can be performed in a faster space (less than a configured timer). After initialization, the GBM may calculate and update minimum distribution of each VNOs bandwidth over beams every update cycle. The update cycle maybe configurable, for example, with a default value of one (1) minute.

For the minimum bandwidth distribution, the GBM may receive parameters from the CROs on every flow control cycle and may generate, for example, a per VNO per beam aggregate minimum subscription over all active guaranteed or real-time sessions for terminals, for example, adaptive Constant Bit Rate (CBR) terminals and Committed Information Rate (CIR) terminals.

In exemplary embodiments, the GBM may update minimum subscription distribution across beams every X minutes (on the order of minutes). However, the GBM may continuously calculate an exponential moving average of aggregated minimum subscription at each flow control cycle when the input parameters from CROs are received. In some embodiments, the GBM may be synchronized to the flow control cycle. If in any flow control cycle input messages are missed, the OBM may skip the calculation and resume the calculation in the next flow control cycle. When X minutes expire, the GBM may use the last sample of the exponential moving average of aggregated minimum subscription values to calculate the minimum distribution. Exemplary steps undertaken by the GBM may include:

Receiving demand messages from the beams

When the first flow control cycle initializes (i.e., after OBM start up), calculating the first distribution of VNOs minimum subscription into subscribed beams. In some embodiments, saving the aggregated per VNO per beam minimum subscription values, and starting a bandwidth distribution timer. The bandwidth distribution timer may be set as 60 seconds or the like.

Performing the following until the bandwidth distribution timer expires for each flow control cycle (initially an expedited timer for the bandwidth distribution timer can be used, for example, the bandwidth distribution timer divided by 6).

Taking the current aggregated per VNO per beam minimum subscription and the previous exponential moving average sample, calculating the new exponential moving average of per VNO per beam minimum subscription;

Assigning a constant value to the beam, when the exponential moving average is zero on a beam, where the constant value maybe a percentage of a VNO's current aggregated minimum subscription over active terminals; and Saving the last exponential moving average of per VNO per beam aggregated minimum subscription.

When the bandwidth distributor timer expires, calculating the minimum bandwidth distribution on subscribed beams for each VNO using an Exponential Moving Average (EMA) of aggregated minimum calculated for each VNO and for each beam. Distributing the minimum for a VNO over beams in a proportional fair manner, for example, Minimum subscription on beam j for a VNO i may be calculated as (VNO i Gateway level minimum subscription * EMA of aggregate minimum subscription of VNO i on beam j)/(summation of EMA aggregate minimum subscription of VNO i over all beams).

When a VNO may not subscribe a minimum Gateway level subscription, minimum subscription distribution is not evaluated by the GBM Once all VNO's minimum subscriptions are distributed into eligible beams, aggregating each VNO's minimum subscription including any static minimum subscription for each beam. In exemplary embodiments, the aggregated minimum across VNOs within a beam is always available.

During a flow control cycle when the inroute and outroute bandwidth managers receive a demand message or the bandwidth status report message that includes aggregated minimum subscriptions of terminals, a total minimum subscription over all active Adaptive CBR and CIR terminals of ith VNO on jth beam is calculated by the inroute and outroute bandwidth managers. Let K be the number of such terminals from a VNO i and on beam j, and using the following variables:

$MC_{kij}$=Minimum Configured subscription of a terminal k for VNO i on beam j $TMC_{ij}=\Sigma_{k=1}^{K}MC_{kij}$–Total minimum subscription of ith VNO on jth beam; K is the number of active ACBR and CIR terminals $MS_i$=Global Gateway Level minimum subscription of VNO i J=Number of beams served by a Gateway Then, $TMC_{ijp}$ may be calculated as Total minimum subscription over active Adaptive CBR and CIR terminals of ith VNO on jth beam on flow control cycle p, where ith VNO subscribed Gateway level minimum bandwidth. In some embodiments, this calculation may be skipped for a VNO m where m does not subscribe to a minimum bandwidth. If a VNO does not subscribe minimum bandwidth at gateway level, then that VNO is not considered in calculating the per beam minimum distribution.

An Exponential Moving Average (EMA) for the aggregate minimum subscription at cycle p of VNO i on jth beam may be expressed as:

$ETMC_{ijp}$=Exponential moving average of total minimum subscription for ith VNO on jth beam at flow control cycle p $ETMC_{ijp-1}$=Exponential moving average of total minimum bandwidth subscription for ith VNO on jth beam at flow control cycle p-1 is:

$$ETMC_{ijp}=\alpha*TMC_{ijp}+(1-\alpha)*ETMC_{ijp-1}$$

where $\alpha$ is the smoothing factor determining the filter equivalent time constant. If the allocation period is T, then the time constant $\tau$ of EMA equals $$-\frac{T}{\ln(1-\alpha)}$$

($\alpha=0.1$ is equivalent to time constant 10 when T=1 period). The default value of $\alpha$ is 0.1 and is configurable. The smoothing factor $\alpha$ and time period T may be configurable in the system.

If $ETMC_{ijp}$ is zero, then a constant value is assigned to it which is a percentage of a VNO's current aggregated minimum subscription over active terminals.

$MinD_{ij}$=minimum subscription distribution of VNO i over beam j where p is the last flow control cycle before the update is:

$$MinD_{ij} = MinS_i * \frac{ETMC_{ijp}}{\sum_{j=1}^{J} ETMC_{ijp}}$$

where $MinS_i$=Global Gateway level minimum subscription of VNO i

For each VNO, the aggregated minimum subscriptions of active terminals of QoS types Adaptive CBR and CIR are calculated on each beam from where a VNO subscribes. A proportional ratio is calculated for each VNO across beams by using the total per VNO per beam number of terminals. For example, if a VNO has aggregated minimum subscription of activated ACBR/CIR terminals on three beams and the aggregated number of these on three beams are 10 Mbps, 30 Mbps and 60 Mbps respectively, then the ratio is 1:3:6 over three beams. If this VNO has a total gateway level minimum subscription of 180 Mbps, then the distribution would be 18 Mbps, 54 Mbps and 108 Mbps respectively.

The above procedure is executed for all VNOs in the system and per beam minimum bandwidth is obtained for all VNOs. In some embodiments, there may be some VNOs which subscribe per beam static minimum bandwidth in the system on the same beams where dynamic VNOs are present.

When the update interval timer X min expires, the latest $ETMC_{ijp}$ is used to calculate the minimum distribution values which may be denoted as $MinD_{ij}$.

The summation of minimum bandwidth subscription over all VNOs within a beam is guaranteed to a VNO. That amount of bandwidth should generally always be available. Once all VNO's minimum subscriptions are distributed into eligible beams, the process aggregates each VNO's minimum subscription including any static minimum subscription for each beam. Ideally, the aggregated minimum across VNOs within a beam is always available.

Embodiment 4: Maximum Subscription Distribution

A VNO may subscribe to a Gateway level maximum or peak bandwidth. This bandwidth may be treated as the best effort bandwidth. Every flow control epoch, for example, every 100 ms, the GBM may receive the information of aggregated maximum bandwidth subscription of all active terminals separately for each beam and each VNO. In some embodiments, the GBM may also receive the current traffic demand per flow control epoch. The total maximum/peak subscription of each VNOs in all beams may be based on all active ACBR terminals maximum guaranteed subscription, and CIR, BE and TCBE terminals maximum subscription.

The GBM calculates a proportional fair average to distribute a VNO's Gateway level maximum subscription into its subscribed beams based on the aggregate maximum subscription of its active terminals and the current demand of active terminals on each beam. The steps of the process are captured as below. In exemplary embodiments, the process is similar between an OBM and an IBM except that the aggregated subscriptions may be coming from different places and in different messages. As such, the term "Bandwidth Manager" is used in this section to describe the process for both an OBM and an IBM, unless explicitly distinguished:

Receiving, from the OBM, demand messages from the beams and/or receiving, from the IBM, bandwidth status report messages from the gateways.

In some embodiments, when it is the first flow control cycle (i.e., after OBM and IBM start up), OBM and IBM calculate the first distribution of VNOs maximum subscription into subscribed beams in a proportional fair manner based on the aggregated maximum subscription and bandwidth demand/usage. In some embodiments, bandwidth managers save the aggregated per VNO per beam maximum subscription values and bandwidth demand/usage over terminals, and start the bandwidth distribution timer, for example, 60 seconds.

For each flow control cycle, the following are performed by the Bandwidth managers until the bandwidth distribution timer expires. Initially an expedited timer can be used, for example, the bandwidth distribution timer divided by 6.

Calculating the new exponential moving average of per VNO per beam maximum subscription and demand/usage based on the current aggregated per VNO per beam maximum subscription, bandwidth demand/usage and the previous exponential moving average sample;

Assigning a constant value to the new exponential moving average of per VNO per beam maximum subscription and demand/usage when exponential moving average is zero. In some embodiments, the constant value may be a percentage of a VNO's Gateway level maximum subscription; and Saving the last exponential moving average of per VNO per beam aggregated maximum subscription and demand/usage.

When the bandwidth distributor timer expires, Bandwidth Managers calculate the maximum bandwidth distribution oversubscribed beams for each VNO using the EMA (Exponential Moving Average) of aggregated maximum and bandwidth demand/usage calculated for each VNO and for each beam. The bandwidth distributor distributes the maximum for a VNO over beams in a proportional fair manner.

Once all VNO's maximum subscriptions are distributed into eligible beams, the process aggregates each VNO's maximum subscription including any static maximum subscription for each beam. In exemplary embodiments, the aggregated maximum across VNOs within a beam is oversubscribed. Based on the estimated current capacity, the oversubscription ratio in each beam is calculated. In some embodiments, the results are saved and displayed, for example, to a network designer or operator.

During flow control cycle when the bandwidth managers receive demand message or the bandwidth status report message that include aggregated maximum subscriptions of terminals, a total maximum subscription over active ACBR (maximum guaranteed), CIR (maximum/peak), TCBE and BE (maximum/peak) terminals of ith VNO on jth beam is calculated by the inroute and outroute bandwidth managers. Let K be the number of such terminals from a VNO i and on beam j, and let, $MxC_{kij}$=Maximum Configured subscription of a terminal k (for ACBR, maximum guaranteed subscription, for CIR, TCBE and BE maximum or peak subscription) for VNO i on beam j $TMxC_{ij}=\Sigma_{k=1}^{K}MxC_{kij}$=Total maximum subscription of ith VNO on jth beam; K is the number of active terminals $TD_{ij}$=total demand/usage aggregated over all active terminals for a VNO i on beam j. On the inroute for ACBR terminals and within guaranteed portion of CIR, usage or throughput is used and for TCBE, BE and Best Effort portion of CIR, demand or unserved backlogs are used $MxS_i$=Global Gateway Level maximum subscription of VNO i J=Number of beams served by a Gateway N=Number of VNOs An exponential moving average (EMA) for the aggregate maximum subscription at cycle p of VNO i on jth beam may be calculated by the GBM, IBM or OBM as:

$ETMxC_{ijp}$=Exponential moving average of total maximum subscription for ith VNO on jth beam at flow control cycle p $ETMxC_{ijp-1}$=Exponential moving average of total maximum bandwidth subscription for ith VNO on jth beam at flow control cycle p−1

$ETMxC_{ijp}\alpha*TMxC_{ijp}+(1-\alpha)*ETMxC_{ijp-1}$, where $\alpha$ is the smoothing factor determining the filter equivalent time constant. If the allocation period is T, then the time constant $\tau$ of EMA equals $$-\frac{T}{\ln(1-\alpha)}$$

($\alpha$=0.1 is equivalent to time constant 10 when T=1 period). The default value of $\alpha$ may be set as a fraction of T, for example, 0.1, and may be configurable. The smoothing factor $\alpha$ and time period T maybe configurable in the system.

In some embodiments, an EMA maybe calculated for the aggregated demand and usage (aggregated over all traffic classes over all active terminals) for a VNO and on each beam. The EMA for the aggregated demand at cycle p of VNO i on jth beam maybe calculated as:

$ETD_{ijp}$=Exponential moving average of total demand/usage for ith VNO on jth beam at flow control cycle p $ETDC_{ijp-1}$=Exponential moving average of total demand/usage for ith VNO on jth beam at flow control cycle p−1

$ETD_{ijp}=\alpha*TD_{ijp}+(1-\alpha)*EDT_{ijp-1}$, where $\alpha$ is the smoothing factor determining the filter equivalent time constant. If the allocation period is T, then the time constant $\tau$ of EMA equals $$-\frac{T}{\ln(1-\alpha)}$$

($\alpha$=0.1 is equivalent to time constant 10 when T=1 period). The default value of $\alpha$ is 0.1 and is configurable. The smoothing factor $\alpha$ and time period T maybe configurable in the system.

$MaxD_{ij}$=Maximum subscription distribution of VNO i over beam j where p is the last flow control cycle before the update $$MaxD_{ij} = MxS_i * \frac{(ETMxC_{ijp}*\text{beta} + ETD_{ijp}*(1-\text{beta}))}{\sum_{j=1}^{J}(ETMxC_{ijp}*\text{beta} + ETD_{ijp}*(1-\text{beta}))}$$

In the above calculation, beta maybe a static factor that provides bias between a configured maximum and actual demand/usage. By default, the value of beta maybe set to provide more weight to actual demand/usage, for example, by setting beta to 0.3.

In exemplary embodiments, the process may also reduce the summation of maximum bandwidth distribution into beams for a VNO such that the summation does not exceed a VNO's gateway level maximum subscription.

The above process is executed for all VNOs in the system and per beam maximum bandwidth is obtained for all VNOs. In some embodiments, some VNOs may subscribe to a per beam static maximum bandwidth in the system on the same beams where dynamic VNOs are present. After the per beam static maximum bandwidth is calculated, the system uses a capacity of each beam to calculate a pre-determined maximum bandwidth value available for all VNOs on each beam.

Once all VNO's maximum subscription are distributed among eligible beams, the process adds up all VNO's maximum subscription including any static maximum subscription for each beam. The process than calculates an estimated current capacity for each beam, which forms the basis to calculate the oversubscription ratio in each beam. In some embodiments, on the inroute side, estimated capacity maybe set as the effective capacity that does not include inroute groups specifically assigned to one or multiple VNOs and inroute groups not used by any VNO. In case of imbalance of oversubscription ratio over beam, the maximum bandwidth distribution maybe adjusted to keep the oversubscription ratio more or less balanced.

Once all VNO's maximum subscription are distributed among eligible beams, the algorithm adds up all VNO's maximum subscription including any static maximum subscription for each beam. Based on the estimated current capacity, the oversubscription ratio in each beam is calculated. In case of imbalance of oversubscription ratio over beam, the maximum bandwidth distribution is adjusted to keep the oversubscription ratio more or less balanced. Also, adjustment is done based on the VNO's priority.

Figure 2:
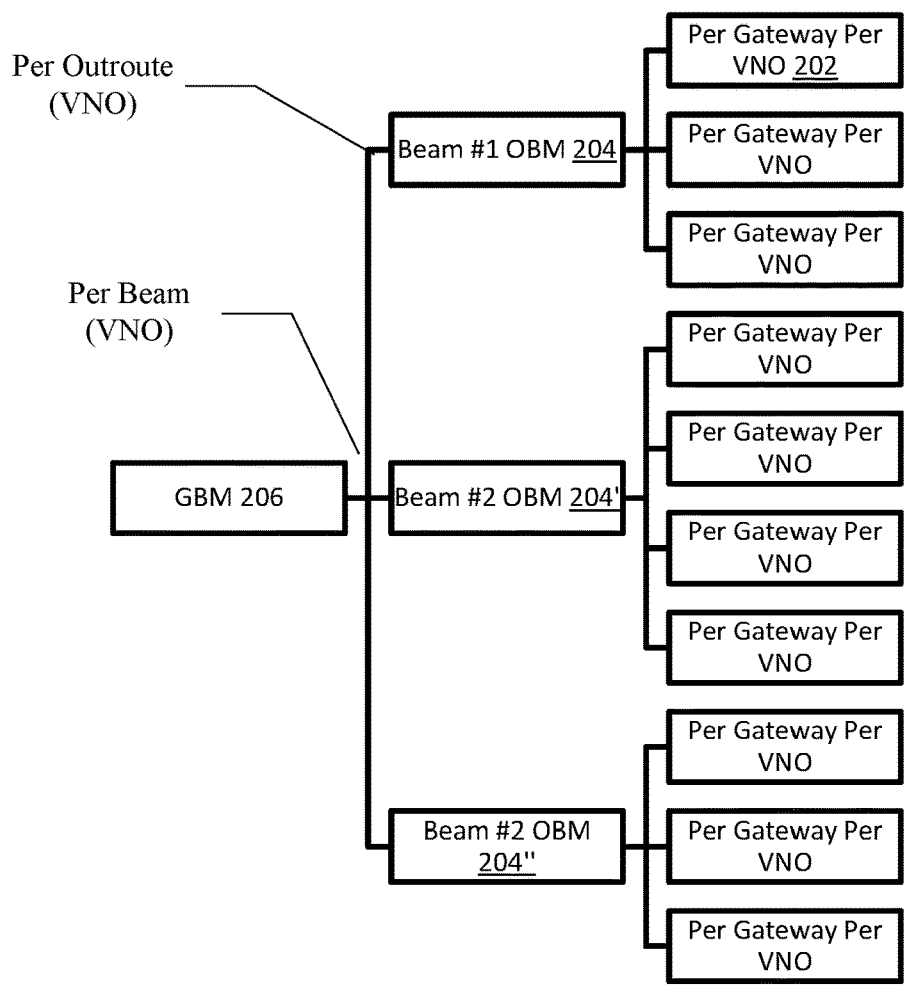
FIG. 2 illustrates communication flows on an outroute chain, according to various embodiments.

FIG. 2 illustrates communication flows on an outroute chain, according to various embodiments.

Demand messages per gateway per VNO 202 are sent from a gateway to a beam-level bandwidth manager, for example, OBM 204, 204', 204" every flow control epoch, for example, every 100 ms. The sending of the demand messages may be in response to a heartbeat message in the system. The OBM 204, 204', 204" may send demand messages to the GBM 206. These demand messages may include an aggregated demand request for each VNO per outroute beam when a beam serves multiple VNOs, otherwise the demand request may include demand an aggregated demand request for one VNO only. The GBM 206 may compute a bandwidth partition per beam per VNO that are provided to the OBM 204, 204', 204" for limiting a bandwidth consumption by the VNO on that beam.

Figure 3:
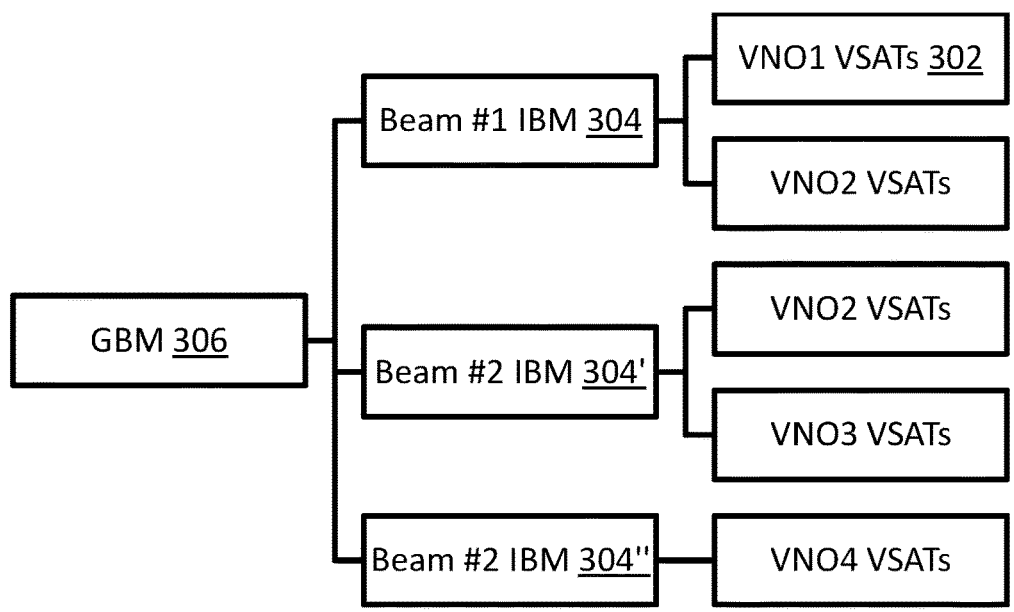
FIG. 3 illustrates communication flows on an inroute chain, according to various embodiments.

FIG. 3 illustrates communication flows on an inroute chain, according to various embodiments.

A beam-level bandwidth manager, for example, IBM 304, 304', 304", receives demand requests 302 from Very Small Apertures Terminals (VSATs) for active data flows from the VSATS. The IBM 304, 304', 304" periodically sends bandwidth status report messages per beam per VNO to a GBM 306, for example, every superframe period such as every 360 ms interval. The GBM 306 may compute a bandwidth partition per beam per VNO that are provided to the IBM 304, 304', 304" for limiting a bandwidth consumption by the VNO on that beam.

Figure 4:
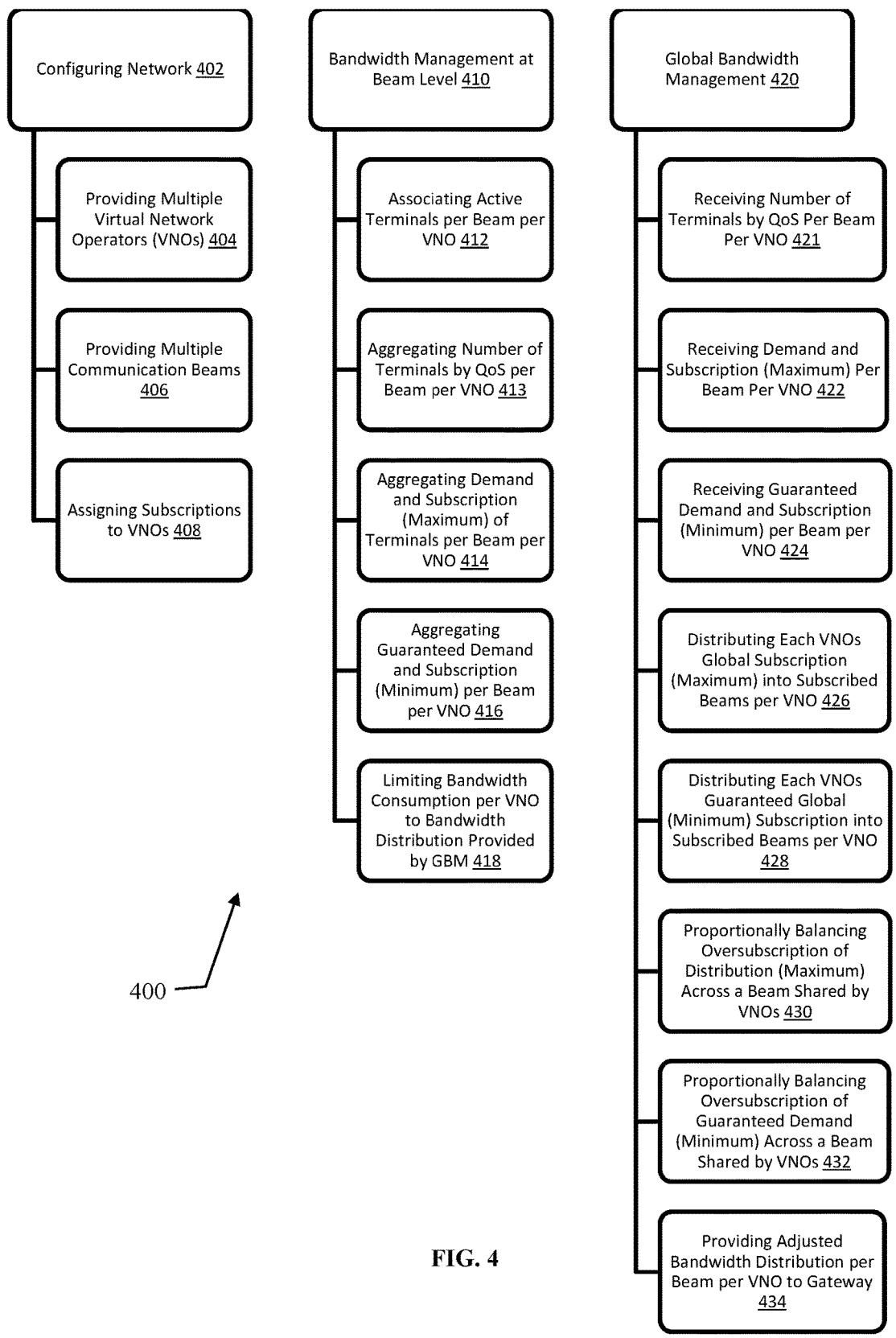
FIG. 4 illustrates a flowchart of an exemplary method for bandwidth management for a HNO, according to some embodiments.

FIG. 4 illustrates a flowchart of an exemplary method for bandwidth management for a HNO, according to some embodiments.

A method 400 for bandwidth management for a HNO is disclosed. The method 400 may include an operation for configuring network 402. The method 400 may include an operation for providing multiple virtual network operators (VNOs) 404. The method 400 may include an operation for providing multiple communication beams 406. The method 400 may include an operation for assigning subscriptions to VNOs 408.

The method 400 may include an operation for bandwidth management at beam level 410. The bandwidth management at beam level operation 410 maybe performed per the teachings associated with the IBM and/or OBM of FIG. 1. The method 400 may include an operation for associating active terminals per beam per VNO 412. The method 400 may include an operation for aggregating number of terminals by QoS per beam per VNO 413. The method 400 may include an operation for aggregating demand and subscription (maximum) of terminals per beam per VNO 414. The method 400 may include an operation for aggregating guaranteed demand and subscription (minimum) per beam per VNO 416. The method 400 may include an operation for limiting bandwidth consumption per VNO to bandwidth distribution provided by GBM 418.

The method 400 may include an operation for global bandwidth management 420. The global bandwidth management operation 400 maybe performed per the teachings associated with the GBM 140 of FIG. 1. The method 400 may include an operation for receiving number of terminals by QoS per beam per VNO 421. The method 400 may include an operation for receiving demand and subscription (maximum) per beam per VNO 422. The method 400 may include an operation for receiving guaranteed demand and subscription (minimum) per beam per VNO 424. The method 400 may include an operation for distributing each VNOs global subscription (maximum) into subscribed beams per VNO 426. The method 400 may include an operation for distributing each VNOs guaranteed global (minimum) subscription into subscribed beams per VNO 428. The method 400 may include an operation for proportionally balancing oversubscription of distribution (maximum) across a beam shared by VNOs 430. The method 400 may include an operation for proportionally balancing oversubscription of guaranteed demand (minimum) across a beam shared by VNOs 432. The method 400 may include an operation for providing adjusted bandwidth distribution per beam per VNO to gateway 434.

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

We claim as our invention:

1. A method for bandwidth management for a Host Network Operator (HNO), the method comprising:
   providing shared beams shared by two or more of a plurality of Virtual Network Operators (VNOs), wherein each VNO has a subscription comprising a global bandwidth limit applicable for a flow control epoch for each VNO and a terminal subscription for each terminal associated with the respective VNO;
   aggregating, in the current flow control epoch, a demand and the terminal subscriptions of active terminals per shared beam per VNO;
   distributing, for each shared beam per VNO, the aggregated demand and active terminal subscriptions into a distribution bandwidth per shared beam per VNO, wherein the distribution bandwidth is based on the respective global bandwidth limit of the respective VNO; and
   proportionally balancing, for each shared beam, an oversubscription of the distribution bandwidths per shared beam per VNO based on the proportionalities of the global bandwidth limit of each VNO subscribing to the shared beam, to provide a proportional distribution bandwidth per shared beam per VNO.

2. The method of claim 1, wherein the distributing further comprises calculating an Exponential Moving Average (EMA) of the aggregated demand and active terminal subscriptions.

3. The method of claim 1, further comprising limiting, in a flow control epoch occurring after the current flow control epoch, a bandwidth consumption by the active terminals of each shared beam based on the proportional distribution bandwidth per shared beam per VNO.

4. The method of claim 1, wherein the network comprises a satellite, a gateway and a plurality of Very Small Aperture Terminals (VSATs), multiple communication beams comprising a Radio Frequency (RF) beam directed from the satellite to the gateway or some of the VSATs, and the shared beams comprises some of the multiple communication beams.

5. The method of claim 4, wherein at least one of the plurality of VSATs is mobile and is capable of communicating using a first beam illuminating a first geographical area or a second differing beam illuminating a second geographical area, wherein the first beam and the second beam are selected from the shared beams and the mobile VSAT moves from the first geographical area to the second geographical area.

6. The method of claim 1, further comprising:
   altering a bandwidth capacity of one or more the shared beams; and
   capping the distribution bandwidth or the proportional distribution bandwidth for each shared beam to be equal to or less than the respective bandwidth capacity of the shared beam.

7. The method of claim 1, wherein the shared beams are managed by a gateway operated by the HNO.

8. The method of claim 1, wherein the shared beams are managed by a plurality of gateways operated by the HNO.

9. The method of claim 1, wherein
   the subscription further comprises a global minimum guaranteed bandwidth,
   a data flow from the active terminals is indicated as either a guaranteed or best-effort data flow, the aggregating further comprises aggregating the demand and active terminal subscriptions for data flows indicated to be guaranteed as a guaranteed demand and active terminal subscription for each shared beam per VNO, and the distributing further comprises setting the bandwidth distribution for each of the shared beams per the VNO to be equal to or greater than the respective guaranteed demand and active terminal subscriptions for each shared beam per VNO.

10. The method of claim 9, further comprising proportionally balancing, for each shared beam, an oversubscription of the distribution bandwidths per shared beam based on the proportionalities of the global minimum bandwidth limit of each VNO subscribing to the shared beam, for calculating the proportional distribution bandwidth per shared beam per VNO.

11. A system to perform bandwidth management for a Host Network Operator (HNO), the system comprising:
   shared beams shared by two or more of a plurality of Virtual Network Operators (VNOs), wherein each VNO has a subscription comprising a global bandwidth limit applicable for a flow control epoch for each VNO and a terminal subscription for each terminal associated with the respective VNO;
   a beam-level bandwidth manager to aggregate, in the current flow control epoch, a demand and the terminal subscriptions of active terminals per shared beam per VNO; and
   a Global Bandwidth Manager (GBM):
      to distribute, for each shared beam per VNO, the aggregated demand and active terminal subscriptions into a distribution bandwidth per shared beam per VNO, wherein the distribution bandwidth is based on the respective global bandwidth limit of the respective VNO; and
      to proportionally balance, for each shared beam, an oversubscription of the distribution bandwidths per shared beam per VNO based on the proportionalities of the global bandwidth limit of each VNO subscribing to the shared beam, to provide a proportional distribution bandwidth per shared beam per VNO.

12. The system of claim 11, wherein, to distribute, the GBM further operates to calculate an Exponential Moving Average (EMA) of the aggregated demand and active terminal subscriptions.

13. The system of claim 11, wherein the beam bandwidth manager further operates to limit, in a flow control epoch occurring after the current flow control epoch, a bandwidth consumption by the active terminals of each shared beam based on the proportional distribution bandwidth per shared beam per VNO.

14. The system of claim 11, wherein the network comprises a satellite, a gateway and a plurality of Very Small Aperture Terminals (VSATs), multiple communication beams comprising a Radio Frequency (RF) beam directed from the satellite to the gateway or some of the VSATs, and the shared beams comprises some of the multiple communication beams.

15. The system of claim 14, wherein at least one of the plurality of VSATs is mobile and is capable of communicating using a first beam illuminating a first geographical area or a second differing beam illuminating a second geographical area, wherein the first beam and the second beam are selected from the shared beams and the mobile VSAT moves from the first geographical area to the second geographical area.

16. The system of claim 11, wherein the beam bandwidth manager further operates to alter a bandwidth capacity of one or more shared beams, and to cap the distribution bandwidth or the proportional distribution bandwidth for each shared beam to be equal to or less than the respective bandwidth capacity of the subscribed beam.

17. The system of claim 11, wherein the shared beams are managed by a gateway operated by the HNO.

18. The system of claim 11, wherein the shared beams are managed by a plurality of gateways operated by the HNO.

19. The system of claim 11, wherein
   the subscription comprises a global minimum guaranteed bandwidth,
   a data flow from the active flows is indicated as either a guaranteed or best-effort data flow,
   the beam bandwidth manager further operates to aggregate the demand and active terminal subscriptions for data flows indicated to be guaranteed as a guaranteed demand and terminal subscription for each shared beam per VNO, and
   the GBM further operates to set the bandwidth distribution for each of the shared beams per the VNO to be equal to or greater than the respective guaranteed demand and active terminal subscriptions for each shared beam per VNO.

20. The system of claim 19, wherein the GBM further operates to proportionally balance, for each shared beam, an oversubscription of the distribution bandwidths per shared beam based on the proportionalities of the global minimum bandwidth limit of each VNO subscribing to the shared beam, for calculating the proportional distribution bandwidth per shared beam per VNO.

* * * * *